United States Patent
Xia

(10) Patent No.: US 11,459,823 B2
(45) Date of Patent: Oct. 4, 2022

(54) BOX COVER DEVICE EXTENDED AND RETRACTED IN TRANSMISSION MANNER AND CONTROL METHOD THEREOF

(71) Applicant: Foshan Bestwyll Auto Accessories Co., Ltd, Foshan (CN)

(72) Inventor: Yong Xia, Foshan (CN)

(*) Notice: Subject to any disclaimer, the term of this patent is extended or adjusted under 35 U.S.C. 154(b) by 44 days.

(21) Appl. No.: 15/931,614

(22) Filed: May 14, 2020

(65) Prior Publication Data

US 2020/0270944 A1   Aug. 27, 2020

(30) Foreign Application Priority Data

Apr. 27, 2020   (CN) .......................... 202010343665.8

(51) Int. Cl.
| | | |
|---|---|---|
| *E06B 9/74* | (2006.01) | |
| *F16H 3/24* | (2006.01) | |
| *B62D 33/04* | (2006.01) | |
| *B60J 7/06* | (2006.01) | |
| *F16H 57/02* | (2012.01) | |
| *E06B 9/68* | (2006.01) | |

(52) U.S. Cl.
CPC .................. *E06B 9/74* (2013.01); *B60J 7/068* (2013.01); *B62D 33/04* (2013.01); *F16H 3/24* (2013.01); *F16H 57/02* (2013.01); *E06B 2009/6809* (2013.01)

(58) Field of Classification Search
CPC ...... E06B 9/74; E06B 2009/6809; E06B 9/08; E06B 7/28; E06B 9/56; E06B 9/68; B60J 7/068; B62D 33/04; F16H 3/24; F16H 57/02

See application file for complete search history.

(56) References Cited

U.S. PATENT DOCUMENTS

| | | | | |
|---|---|---|---|---|
| 2018/0118002 A1* | 5/2018 | Koengeter | ............... | B60J 7/196 |
| 2019/0234131 A1* | 8/2019 | Seadia | ....................... | E06B 9/90 |
| 2020/0270944 A1* | 8/2020 | Xia | .......................... | B60J 7/068 |

FOREIGN PATENT DOCUMENTS

| | | | | |
|---|---|---|---|---|
| CN | 204821289 U | * | 12/2015 | |
| CN | 108571283 A | * | 9/2018 | |
| CN | 109036207 A | * | 12/2018 | |
| CN | 211252522 U | * | 8/2020 | |
| CN | 109036207 B | * | 10/2020 | |

* cited by examiner

*Primary Examiner* — Victor L Macarthur

(57) ABSTRACT

The present invention discloses a box cover device extended and retracted in a transmission manner and a control method thereof. The device comprises a transmission gear, a roller shutter shaft gear and a clutch gear. The transmission gear and the roller shutter shaft gear are arranged oppositely, and a clutching space is reserved between the transmission gear and the roller shutter shaft gear. A middle shaft is arranged at the center line of the clutching space vertical to the center connection line of the transmission gear and the roller shutter shaft gear. The box cover device extended and retracted in a clutch type transmission manner of the present invention is convenient and quick to operate and has high working efficiency

11 Claims, 3 Drawing Sheets

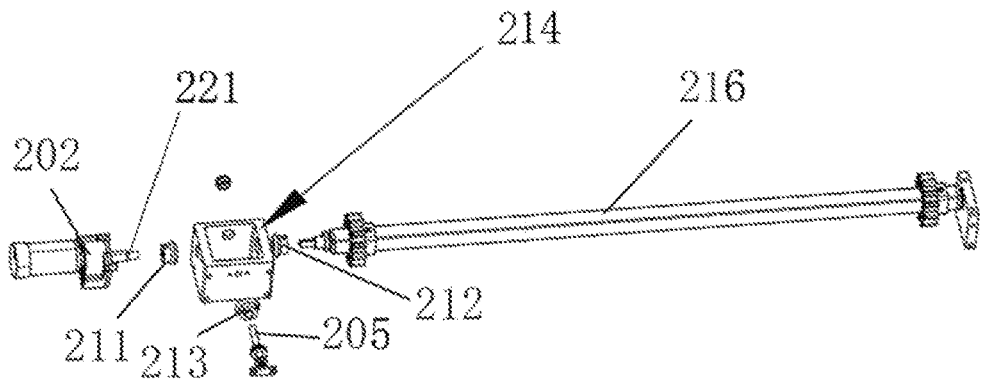

FIG. 5

```
┌─────────────────────────────────────────────────────────────────┐
│ Oppositely arranging the transmission gear and the roller shutter shaft gear and reserving a │─ 601
│ clutching space between the transmission gear and the roller shutter shaft gear; arranging a │
│ middle shaft at the center line of the clutching space vertical to the center connection line of the │
│ transmission gear and the roller shutter shaft gear; using the clutch gear to sleeve the middle │
│ shaft such that the clutch gear is engaged with the transmission gear and the roller shutter shaft │
│ gear; arranging a translation mechanism between the middle shaft and the gearbox case wall; │
└─────────────────────────────────────────────────────────────────┘
                                    │
┌─────────────────────────────────────────────────────────────────┐
│ Connecting the transmission gear and the output shaft of the transmission motor; connecting the │─ 602
│ roller shutter shaft gear and the roller shutter shaft; connecting the roller shutter shaft and the │
│ roller shutter cover; placing the roller shutter cover at the opened top of the box; connecting the │
│ transmission controller and the transmission motor to form a box cover extended and retracted │
│ in a transmission manner; │
└─────────────────────────────────────────────────────────────────┘
                                    │
┌─────────────────────────────────────────────────────────────────┐
│ When the transmission controller receives the extension, retraction or stop control signal for the │─ 603
│ roller shutter cover, relatively generating the forward/reverse rotation or stop control signal to │
│ control the transmission motor to rotate in a forward/reverse manner or stop, driving the roller │
│ shutter shaft gear to rotate in a forward/reverse manner or stop through engagement │
│ transmission, so as to drive the roller shutter cover to extend, retract or stop; │
└─────────────────────────────────────────────────────────────────┘
                                    │
┌─────────────────────────────────────────────────────────────────┐
│ Using the translation mechanism to control the middle shaft to drive the clutch gear to move │─ 604
│ away from the transmission gear and the roller shutter shaft gear, so as to release engagement │
│ with the transmission gear and the roller shutter shaft gear, wherein the roller shutter shaft gear │
│ separates from the engagement transmission with the transmission gear; │
└─────────────────────────────────────────────────────────────────┘
                                    │
┌─────────────────────────────────────────────────────────────────┐
│ Using the translation mechanism to control the middle shaft to drive the clutch gear to move │─ 605
│ close to the transmission gear and the roller shutter shaft gear, so as to recover engagement with │
│ the transmission gear and the roller shutter shaft gear, wherein the roller shutter shaft gear │
│ recovers engagement transmission with the transmission gear. │
└─────────────────────────────────────────────────────────────────┘
```

FIG. 6

BOX COVER DEVICE EXTENDED AND RETRACTED IN TRANSMISSION MANNER AND CONTROL METHOD THEREOF

TECHNICAL FIELD

The present invention relates to the field of transmission type extension and retraction technologies, and in particular to a box cover device extended and retracted in a transmission manner and a control method thereof.

BACKGROUND

Boxes for containing and carrying articles provide enormous convenience for people's lives. Generally, the box for containing articles includes box panels and a storage cavity, wherein the box panels surround to form the storage cavity. The box for containing articles may be opened at one side face, the top, or the side face and the top in a matching manner. Recently, with the development of vehicles, a pickup truck with an opened box-shaped cargo area is more and more popular The pickup truck is a light-duty truck having a top-opened cargo area arranged at the rear of the cab, and side panels of the cargo area are integrated with the cab. The pickup truck further is a passenger-cargo dual-purpose vehicle having a passenger compartment at the front and a cargo area at the rear. The cargo area is covered with an electric tonneau cover such that the carried cargoes are prevented from the influence of the weather and the theft; thus, the cargo area is convenient to open and close, and the appearance of the pickup truck is more attractive. In a transmission clutch structure of an electric retractable tonneau cover of the existing pickup truck on the market, a motor main shaft and a roller shutter main shaft are connected by using an internal hexagonal sleeve, and they are regular hexagonal main shafts. Transmission of power is achieved when the internal hexagonal sleeve sleeves the motor main shaft and the roller shutter main shaft so as to open and close an electric roller shutter. When the internal hexagonal sleeve moves to leave from the motor main shaft, the transmission of power of the motor main shaft is interrupted; the electric tonneau cover can be opened and closed manually at this time.

When the electric tonneau cover of the existing pickup truck cannot be regularly opened and closed due to a power system failure and the like, because the internal hexagonal sleeve has a large contact area, and the motor main shaft still affects the internal hexagonal sleeve and the roller shutter main shaft during rotation, it is difficult to move the internal hexagonal sleeve. To eliminate the abnormal state, the internal hexagonal sleeve needs to move to the motor shaft. Such operation should be completed without observation, and the internal hexagonal sleeve has the large contact area; so, it needs a professional person to complete such complex operation. Furthermore, after the electric tonneau cover is mounted on the cargo area of the pickup truck, if there is a circuit failure, or the car battery is lack of power and cannot regularly drive the motor to rotate, or the motor is damaged, the electric tonneau cover cannot be opened; so, the regular use of the cargo area is severely influenced.

Therefore, it is an emergent technical problem how to provide a convenient, rapid and high-stability box cover device extended and retracted in a transmission manner in the prior art.

SUMMARY

The present invention provides a box cover device extended and retracted in a transmission manner and a control method thereof to solve the problems that there are not a transmission clutch of a retractable box cover, which has a simple structure, is convenient to use and can quickly disconnect or connect engagement transmission between a motor shaft gear and a roller shutter shaft gear, as well as a control method in the prior art.

The box cover device extended and retracted in a transmission manner provided by the present invention comprises a gearbox, a transmission motor, a roller shutter cover and a transmission controller.

The gearbox comprises a transmission gear, a roller shutter shaft gear and a clutch gear. The transmission gear and the roller shutter shaft gear are arranged oppositely, and a clutching space is reserved between the transmission gear and the roller shutter shaft gear. A middle shaft is arranged at the center line of the clutching space vertical to the center connection line of the transmission gear and the roller shutter shaft gear. The clutch gear sleeves the middle shaft and is engaged with the transmission gear and the roller shutter shaft gear. A translation mechanism is arranged between the middle shaft and a gearbox case wall. The translation mechanism controls the middle shaft to drive the clutch gear to move close to/away from the transmission gear and the roller shutter shaft gear, The clutch gear, the transmission gear and the roller shutter shaft gear form a gear clutch.

The transmission gear is connected with an output shaft of the transmission motor. The output shaft drives the transmission gear to rotate in a forward/reverse manner or stop. The roller shutter shaft gear is connected with a roller shutter shaft and drives the roller shutter shaft to rotate in a forward/reverse manner or stop so as to drive a roller shutter cover connected with the roller shutter shaft to extend/retract or stop The roller shutter cover is located at an opened top of a box. The roller shutter cover gradually covers the box during extension and uncovers the box during retraction. The clutch gear connects/disconnects engagement transmission with the transmission gear and the roller shutter shaft gear when moving close to/away from the transmission gear and the roller shutter shaft gear.

The transmission controller is connected with the transmission motor. The transmission controller receives forward/reverse rotation or stop control signals, then generates relative control commands to control the transmission motor to rotate in a forward/reverse manner or stop.

Optionally, the translation mechanism is a clutch thread which is arranged on the outer side of the middle shaft and mutually matches with the gearbox case wall. The clutch thread controls the middle shaft to move close to/away from the transmission gear and the roller shutter shaft gear.

Optionally, a translation push-pull rod and/or a knob is arranged at one end, extending from the gearbox case wall, of the middle shaft. The translation push-pull rod and/or the knob drives the translation mechanism to control the middle shaft to move close to/away from the transmission gear and the roller shutter shaft gear.

Optionally, the box cover device extended and retracted in a transmission manner further comprises a locating stop sheet. The locating stop sheet sleeves the middle shaft and is located between the clutch gear and the gearbox case wall. The diameter of the locating stop sheet is larger than that of a through hole, through which the middle shaft penetrates the gearbox case wall.

Optionally, the box cover device extended and retracted in a transmission manner further comprises a plane thrust bearing. The plane thrust bearing sleeves the middle shaft and is located between the locating stop sheet and the clutch gear.

Optionally, the transmission controller is communicated with a control button through a wire communication module, and/or is communicated with a remote control in a frequency band through a wireless communication module. The transmission controller receives a control signal to decode. When the decoded signal data is consistent with the preset remote control information data, the transmission controller generates a relative forward/reverse rotation or stop control signal for the transmission motor according to the decoded signal data.

Optionally, the wireless communication module is a Bluetooth communication module or a mobile network communication module.

Optionally, the box cover device extended and retracted in a transmission manner further comprises a light. The light is connected with the transmission controller The transmission controller compares the forward/reverse rotation or stop control signal with a preset light turn-on policy to generate a turn-on command for the light, so as to control the light to be turned on.

In the other aspect, the present invention further provides a control method of the box cover device extended and retracted in a transmission manner. The control method comprises:

oppositely arranging the transmission gear and the roller shutter shaft gear and reserving a clutching space between the transmission gear and the roller shutter shaft gear; arranging a middle shaft at the center line of the clutching space vertical to the center connection line of the transmission gear and the roller shutter shaft gear; using the clutch gear to sleeve the middle shaft such that the clutch gear is engaged with the transmission gear and the roller shutter shaft gear; arranging a translation mechanism between the middle shaft and the gearbox case wall;

connecting the transmission gear and the output shaft of the transmission motor; connecting the roller shutter shaft gear and the roller shutter shaft; connecting the roller shutter shaft and the roller shutter cover; placing the roller shutter cover at the opened top of the box; connecting the transmission controller and the transmission motor to form a box cover extended and retracted in a transmission manner;

when the transmission controller receives the extension, retraction or stop control signal for the roller shutter cover, relatively generating the forward/reverse rotation or stop control signal to control the transmission motor to rotate in a forward/reverse manner or stop, driving the roller shutter shaft gear to rotate in a forward/reverse manner or stop through engagement transmission, so as to drive the roller shutter cover to extend, retract or stop;

using the translation mechanism to control the middle shaft to drive the clutch gear to move away from the transmission gear and the roller shutter shaft gear, so as to release engagement with the transmission gear and the roller shutter shaft gear, wherein the roller shutter shaft gear separates from the engagement transmission with the transmission gear;

using the translation mechanism to control the middle shaft to drive the clutch gear to move close to the transmission gear and the roller shutter shaft gear, so as to recover engagement with the transmission gear and the roller shutter shaft gear, wherein the roller shutter shaft gear recovers engagement transmission with the transmission gear.

Optionally, the translation mechanism is a clutch thread which is arranged on the outer side of the middle shaft and mutually matches with the gearbox case wall.

Screwing a translation push-pull rod and/or a knob arranged at one end, extending from the gearbox case wall, of the middle shaft, the middle shaft is controlled to move close to/away from the transmission gear and the roller shutter shaft gear through the clutch thread.

The box cover device extended and retracted in a transmission manner of the present invention has a simple structure, low production costs, stable performances, and improved market competitiveness Connection or disconnection of power transmission between the transmission shaft gear and the roller shutter shaft gear can be achieved by rotating the middle shaft. The operation is convenient and rapid, and the working efficiency is high.

BRIEF DESCRIPTION OF THE DRAWINGS

To describe the technical solutions in the embodiments of the present invention more clearly, the following briefly introduces the accompanying drawings for describing the embodiments. Apparently, the accompanying drawings in the following description show merely some embodiments of the present invention, and a person of ordinary skill in the art may still derive other drawings from these accompanying drawings without creative efforts.

FIG. 5 is a schematic diagram showing a connection structure of a roller shutter shaft gear and a roller shutter shaft in a box cover device extended and retracted in a transmission manner in an embodiment of the present invention.

FIG. 6 is a flow chart of a control method of a box cover device extended and retracted in a transmission manner in an embodiment of the present invention.

DESCRIPTION OF THE EMBODIMENTS

Figure 1:
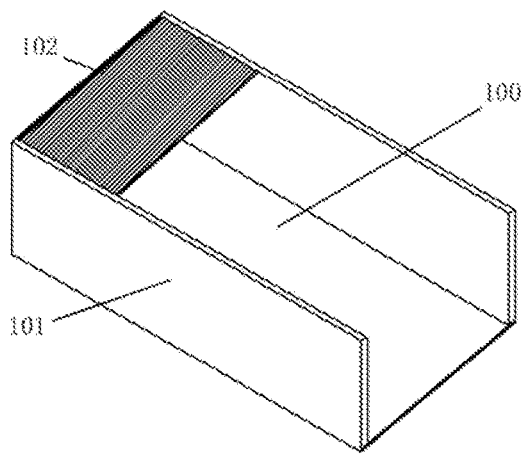
FIG. 1 is a schematic structural diagram of a box equipped with a box cover device extended and retracted in a transmission manner in an embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The existing box with a cover on the market, such as an intelligent electric retractable tonneau cover of the existing pickup truck has a transmission clutch structure, wherein a motor main shaft and a roller shutter main shaft are connected by using an internal hexagonal sleeve, and they are regular hexagonal main shafts. Transmission of power is achieved when the internal hexagonal sleeve sleeves the motor main shaft and the roller shutter main shaft so as to turn on and turn off an electric roller shutter. When the internal hexagonal sleeve moves to leave from the motor main shaft, the transmission of power of the motor main shaft is interrupted; the electric tonneau cover can be opened and closed manually at this time.

In the above solution, when the electric tonneau cover cannot be regularly opened and closed, because the internal hexagonal sleeve has a large contact area, and the motor main shaft still affects the internal hexagonal sleeve and the roller shutter main shaft during rotation, it is difficult to move the internal hexagonal sleeve. To eliminate the abnormal state, the internal hexagonal sleeve needs to be moved to the motor shaft. Such operation may be completed without observation, and the internal hexagonal sleeve has the large contact area; so, it needs a professional person to complete such complex operation.

Furthermore, after the electric tonneau cover is mounted on the cargo area of the pickup truck, if there is a circuit failure, or the car battery is lack of power and cannot regularly drive the motor to rotate, or the motor is damaged, the electric tonneau cover cannot be opened, thereby severely influencing the regular use of the cargo area. The present invention achieves the transmission of power through three bevel gears. When the tonneau cover cannot be regularly used on circuit failure, the middle bevel shaft is moved to disconnect the transmission of power. Therefore, the bevel gear is better to connect or disconnect the transmission of power. Because the bevel gear has many teeth, the bevel gear leaves from the motor main shaft and the roller shutter main shaft without too much efforts. When the bevel gear is moved to be connected with the motor main shaft and the roller shutter main shaft, the bevel gear may adaptively regulate to a proper position according to self position so as to be engaged with the transmission gear and the roller shutter shaft gear.

A middle shaft with threads and the diameter of φ10 mm is used to move the middle bevel clutch gear. One end of the middle shaft has a cross slot (or other slot for rotation support). To disconnect the transmission of power, the middle shaft can be moved only by using one "straight slot screwdriver" to screw the cross slot. To achieve forward rotation, the middle shaft is connected with the motor main shaft and the roller shutter main shaft. To achieve reverse rotation, the middle shaft separates from the clutch gear to disconnect the transmission of power.

Figure 2:
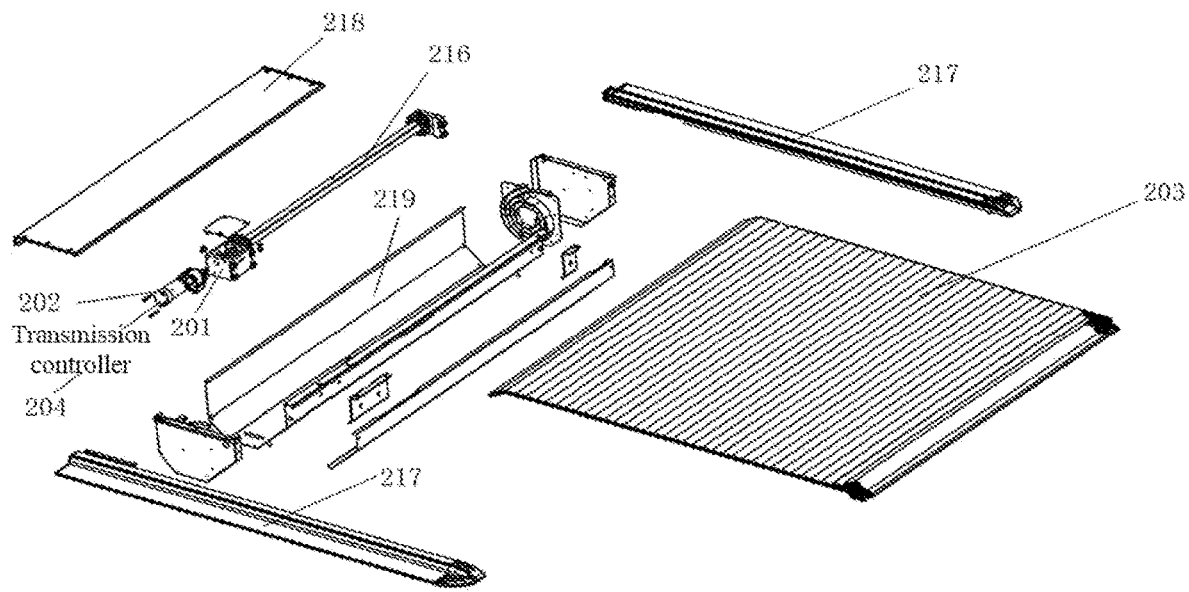
FIG. 2 is an exploded view of a box cover device extended and retracted in a transmission manner in an embodiment of the present invention.
Figure 3:
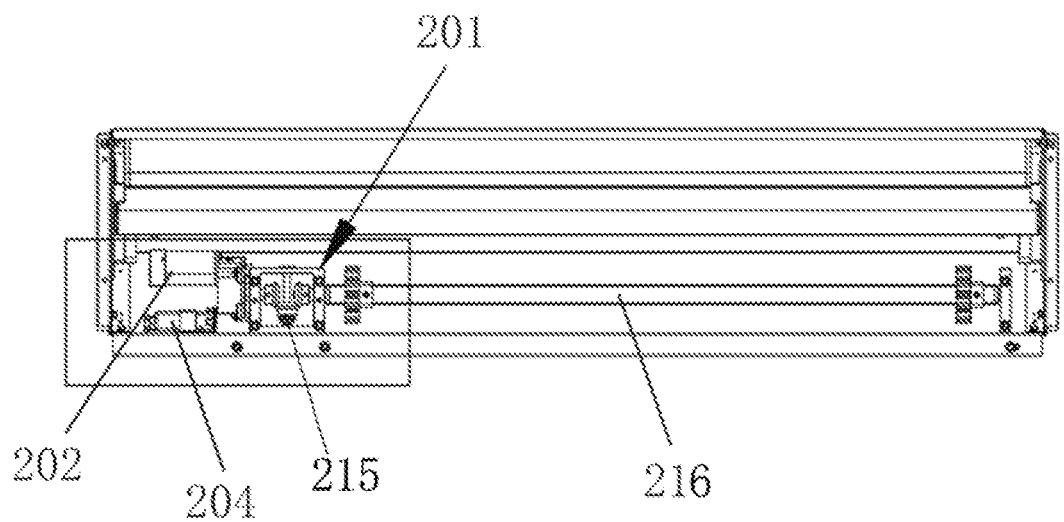
FIG. 3 is a schematic structural diagram of a box cover device extended and retracted in a transmission manner in an embodiment of the present invention.
Figure 4:
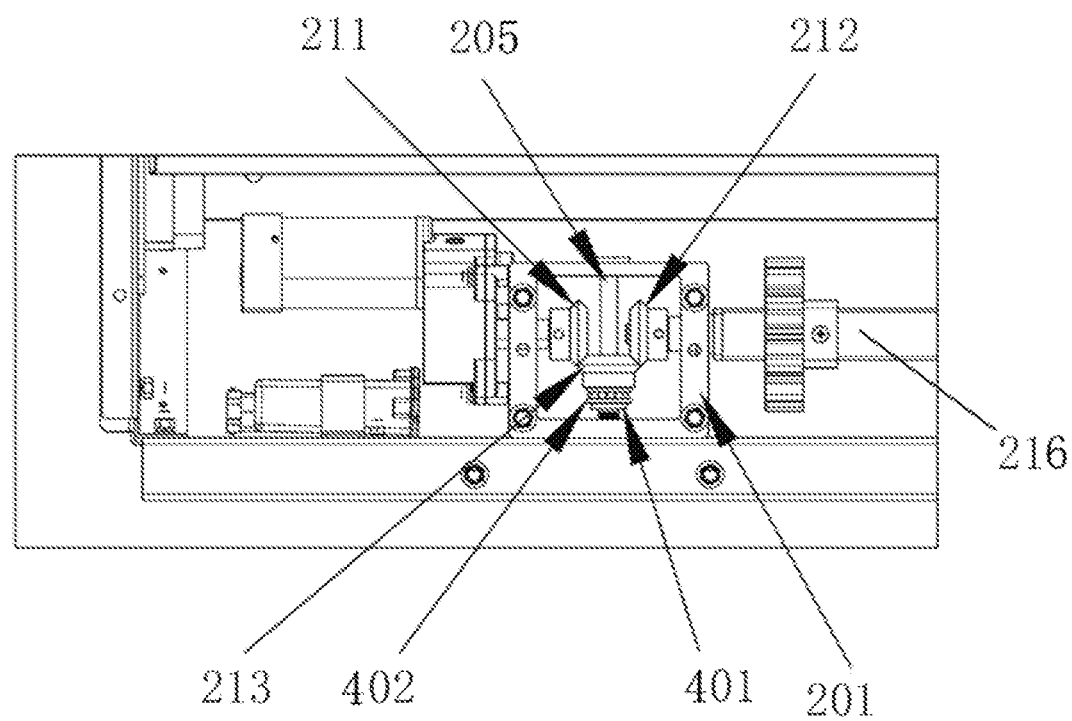
FIG. 4 is a schematic diagram showing a connection structure of a transmission gear and an output shaft of a transmission motor in a box cover device extended and retracted in a transmission manner in an embodiment of the present invention.

Specifically, as shown in FIG. 1 to FIG. 5, FIG. 1 is a schematic structural diagram of a box equipped with a box cover device extended and retracted in a transmission manner in an embodiment. FIG. 2 is an exploded view of a box cover device extended and retracted in a transmission manner in an embodiment. FIG. 3 is a schematic structural diagram of a box cover device extended and retracted in a transmission manner in an embodiment. FIG. 4 is a schematic diagram showing a connection structure of a transmission gear and an output shaft of a transmission motor in a box cover device extended and retracted in a transmission manner in an embodiment. FIG. 5 is a schematic diagram showing a connection structure of a roller shutter shaft gear and a roller shutter shaft in a box cover device extended and retracted in a transmission manner in an embodiment of the present invention.

As shown in the drawings, a box 100 comprises a box space, wherein side panels 101 surround to form the box space. A box cover device extended and retracted in a transmission manner 102 is mounted as the cover of the box 100. A roller shutter shaft drives a roller shutter cover to extend or retract in an opening direction of the box cover under the transmission control of the motor so as to cover or uncover an upper side face of the box. An inner groove in one end of the roller shutter cover is engaged with a plastic gear of the roller shutter shaft and then is fixed to the roller shutter shaft. When the roller shutter shaft rotates, the roller shutter cover is pushed to be stored in spiral rails on two sides of the box or is released to extend along the side walls of an opened cover of the box.

Specifically, the box cover device extended and retracted in a transmission manner comprises a gearbox 201, a transmission gear 202, a roller shutter cover 203 and a transmission controller 204.

The gearbox 201 has a gearbox cavity, wherein gearbox case walls 214 on the outer side surround to form the gearbox cavity for containing a gear clutch formed by gears. The gear clutch comprises a transmission gear 211, a roller shutter shaft gear 212 and a clutch gear 213. The transmission gear 211 and the roller shutter shaft gear 212 are arranged oppositely, and a clutching space is reserved between the transmission gear and the roller shutter shaft gear. A middle shaft 205 is arranged at the center line of the clutching space vertical to the center connection line of the transmission gear and the roller shutter shaft gear. The clutch gear 213 sleeves the middle shaft and is engaged with the transmission gear 211 and the roller shutter shaft gear 212. A translation mechanism 215 is arranged between the middle shaft 205 and the gearbox case wall 214. The translation mechanism 215 controls the middle shaft 205 to drive the clutch gear 213 to move close to/away from the transmission gear 211 and the roller shutter shaft gear 212. The clutch gear, the transmission gear 211 and the roller shutter shaft gear 212 form the gear clutch. The other end, opposite to the translation mechanism 215, of the middle shaft 205 can be rotationally mounted in a locating hole on an opposite side of the gearbox through a sleeve, so, the middle shaft is stably fixed.

Optionally, the gearbox is rectangular. The transmission shaft gear and the roller shutter shaft gear are transversely mounted in the gearbox. The middle shaft and the clutch gear are longitudinally mounted in the gearbox. The roller shutter shaft gear is fixedly connected with the roller shutter shaft. When the transmission gear rotates to drive the roller shutter shaft to rotate through the clutch gear, the roller shutter shaft gear drives the roller shutter to open or close.

The transmission gear 211 is connected with an output shaft 221 of the transmission motor 202. The output shaft 221 drives the transmission gear to rotate in a forward/reverse manner or stop. The roller shutter shaft gear 212 is connected with a roller shutter shaft 216 and drives the roller shutter shaft 206 to rotate in a forward/reverse manner or stop so as to drive a roller shutter cover 203 connected with the roller shutter shaft to extend/retract or stop. The roller shutter cover 203 is located at an opened top of a box. The roller shutter cover gradually covers the box during extension and uncovers the box during retraction. The clutch gear 213 connects/disconnects engagement transmission with the transmission gear 211 and the roller shutter shaft gear 212 when moving close to/away from the transmission gear 211 and the roller shutter shaft gear 212. Roller shutter support frames 217 are arranged on two sides of the roller shutter cover 203 and are utilized as extension and retraction rails of the roller shutter cover. The roller shutter shaft 216 can be provided with a dustproof cover 218. The gearbox 201, the transmission motor 202 and the roller shutter shaft 216 can be arranged in a mounting box 219.

The transmission controller 211 is connected with the transmission motor 202. The transmission controller receives forward/reverse rotation or stop control signals, then generates relative control commands to control the transmission motor 202 to rotate in a forward/reverse manner or stop. The transmission controller can further receive other control signals, such as a control signal for turning on or turning off a light to generate a relative control command to control the light to be turned on or turned off.

Optionally, the transmission controller 211 is communicated with a control button through a wire communication module, and/or is communicated with a remote control in a frequency band through a wireless communication module. The transmission controller receives a control signal to decode. When the decoded signal data is consistent with the preset remote control information data, the transmission controller generates a relative forward/reverse rotation or stop control signal for the transmission motor according to the decoded signal data. The wireless communication module is a Bluetooth communication module or a mobile network communication module. The wireless communication module receives control signals transmitted by the Bluetooth communication module or the mobile network to achieve wireless control, even remote control, on the box cover device extended and retracted in a transmission manner.

In some optional embodiments, the box cover device extended and retracted in a transmission manner may further comprise a light. The light is connected with the transmission controller. The transmission controller compares the forward/reverse rotation or stop control signal with a preset light turn-on policy to generate a turn-on command for the light, so as to control the light to be turned on.

In some optional embodiments, the translation mechanism 215 is a clutch thread which is arranged on the outer side of the middle shaft 205 and mutually matches with the gearbox case wall The clutch thread controls the middle shaft to move close to/away from the transmission gear and the roller shutter shaft gear.

In some optional embodiments, a translation push-pull rod and/or a knob is arranged at one end, extending from the gearbox case wall, of the middle shaft 205. For example, a screwdriver screws a rotation cross slot, the translation mechanism is driven to control the middle shaft to move close to/away from the transmission gear and the roller shutter shaft gear.

Optionally, the box cover device extended and retracted in a transmission manner may further comprise a locating stop sheet 401. The locating stop sheet sleeves the middle shaft 205 and is located between the clutch gear 213 and the gearbox case wall 214. The diameter of the locating stop sheet is larger than that of a through hole, through which the middle shaft penetrates the gearbox case wall. Optionally, the box cover device extended and retracted in a transmission manner further comprises a plane thrust bearing 402. The plane thrust bearing sleeves the middle shaft and is located between the locating stop sheet 401 and the clutch gear 213. The plane thrust bearing 402 disperses the force of the transmission shaft gear to the clutch gear during rotation of the middle shaft gear so as to avoid abrasion of the clutch gear and the middle shaft.

FIG. 6 is a flow chart of a control method of a box cover device extended and retracted in a transmission manner in an embodiment. The existing electric roller shutter on the market is merely controlled by a "433M remote control key" If the remote control key is damaged, lost or out of power, the electric roller shutter cannot be used Furthermore, frequency band 433M belongs to the public frequency band, and many civil devices (such as motorbike key, automobile key, electric roller shutter and the like) use it, so signals in such frequency band are easy to be influenced to be instable. In the embodiment, besides the existing control manner, there are three other control manners to control the box cover extended and retracted in a transmission manner on the box.

The first control manner is especially for a vehicle box, building a control unit in an original vehicle remote control key. When using the vehicle, the user must carry the vehicle key. Therefore, in such control manner, the convenience of the electric roller shutter is greatly improved, and the user can control the electric roller shutter without the need of carrying any extra devices.

The second control manner is: using Wechat Mini Program to control. Nowadays, the smart phone and the social application are very popular. A mini program for controlling the electric roller shutter can be developed based on the social application platform. Specifically, a processing unit and a Bluetooth module are configured in a transmission controller; identity information of the user is verified based on data interaction between the mini program and the background; then the mini program is communicated with the Bluetooth module of the box cover device extended and retracted in a transmission manner to receive a control signal to remotely control the box cover. In this case, as long as carrying the smart phone, the user can control the roller shutter. Furthermore, data about use situations of the user and states of the device can be stored and analysed in a big data analysis manner. Therefore, the user experience and the use safety are improved. The Bluetooth module is built in the controller of the electric roller shutter. Therefore, using the mini program of the smart phone, the user can control all functions and states of the electric roller shutter.

The third control manner is: mounting a control button additionally, which is connected to the transmission controller through communication lines. In such manner, the user can freely open and close the electric roller shutter without leaving a control position and opening the roller shutter.

Specifically, the control method of the box cover device extended and retracted in a transmission manner can be implemented by the above box cover device extended and retracted in a transmission manner. The control method comprises the following steps:

Step 601: oppositely arranging the transmission gear and the roller shutter shaft gear and reserving a clutching space between the transmission gear and the roller shutter shaft gear; arranging a middle shaft at the center line of the clutching space vertical to the center connection line of the transmission gear and the roller shutter shaft gear; using the clutch gear to sleeve the middle shaft such that the clutch gear is engaged with the transmission gear and the roller shutter shaft gear; arranging a translation mechanism between the middle shaft and the gearbox case wall;

Step 602: connecting the transmission gear and the output shaft of the transmission motor; connecting the roller shutter shaft gear and the roller shutter shaft; connecting the roller shutter shaft and the roller shutter cover; placing the roller shutter cover at the opened top of the box; connecting the transmission controller and the transmission motor to form a box cover extended and retracted in a transmission manner;

Step 603: when the transmission controller receives the extension, retraction or stop control signal for the roller shutter cover, relatively generating the forward/reverse rotation or stop control signal to control the transmission motor to rotate in a forward/reverse manner or stop, driving the roller shutter shaft gear to rotate in a forward/reverse manner or stop through engagement transmission, so as to drive the roller shutter cover to extend, retract or stop;

Step 604: using the translation mechanism to control the middle shaft to drive the clutch gear to move away from the transmission gear and the roller shutter shaft gear, so as to release engagement with the transmission gear and the roller shutter shaft gear, wherein the roller shutter shaft gear separates from the engagement transmission with the transmission gear;

Step 605: using the translation mechanism to control the middle shaft to drive the clutch gear to move close to the transmission gear and the roller shutter shaft gear, so as to recover engagement with the transmission gear and the roller shutter shaft gear, wherein the roller shutter shaft gear recovers engagement transmission with the transmission gear.

The transmission controller arranged in the roller shutter box may detect the received signal with the 433 MHz frequency, decodes the signal and compares the decoded data with a preset remote control information. If the comparison succeeds, the received signal is a valid remote control signal, and a relative operation (such as turning on/off the roller shutter or the light) is carried out; if the comparison fails, the received signal is determined to be a signal from another product or an interference signal, no response is carried out.

Optionally, the box cover device extended and retracted in a transmission manner further comprises a voltage stabilizer. The voltage stabilizer is connected between the transmission motor and a power supply to control the power supply to output stable voltage to the transmission motor so as to ensure the electric roller shutter to run at constant speed, thereby solving a problem that the existing electric roller shutter on the market cannot run at constant speed. Generally, to the existing electric roller shutter on the market, when the voltage of the power supply is high, the running speed of the roller shutter is high, and with the reducing of the battery voltage, the running speed of the roller shutter is also reduced. The box cover device extended and retracted in a transmission manner may further set control on an opening/closing position of the electric roller shutter. When a control signal for the opening/closing position of the electric roller shutter is received, the transmission time of the powered transmission motor is calculated in combination with the total extension length and the running speed of the electric roller shutter. When the transmission time is up, the transmission motor is powered off automatically. When a control signal for recovering the power of the transmission motor is received, the transmission motor is powered on. Preferably, the box cover device extended and retracted in a transmission manner may further set regulation control on an opening/closing speed of the electric roller shutter. When a control signal for the opening/closing speed of the electric roller shutter is received from the user, a regulation voltage value is obtained in combination with running parameters of the transmission motor and the relative relationship of the voltage and the running speed of the transmission motor. Then, a voltage transformer is controlled to output the voltage to the transmission motor at the regulation voltage value.

A motor control part utilizes a PID controller and acquires the running speed of the motor through a Hall sensor mounted on a motor shaft and also the running current of the motor through a board-mounted IC in real time. A motor driving part regulates the conduction current of the motor in a PWM manner in real time in combination with the currently acquired speed and current such that the motor runs at constant speed Furthermore, if Hall signal or current is abnormal, a loudspeaker on the controller gives different sound combinations to alarm or the power supply of the transmission motor is immediately turned off.

In some optional embodiments, the translation mechanism is a clutch thread which is arranged on the outer side of the middle shaft and mutually matches with the gearbox case wall. Screwing a translation push-pull rod and/or a knob arranged at one end, extending from the gearbox case wall, of the middle shaft, the middle shaft is controlled to move close to/away from the transmission gear and the roller shutter shaft gear through the clutch thread.

Those of ordinary skill in the art may understand that implementation of all or some of steps in the method of the above embodiment may be completed by a program instructing relevant hardware. The program may be stored in a computer non-volatile readable memory. When the program is run, the flow of the method of the embodiment may be included. Any reference to memory, storage, database or other mediums used in each embodiment provided by the present invention may include a non-volatile or volatile memory. The non-volatile memory can include read only memory (ROM), programmable ROM (PROM), electrically programmable ROM (EPROM), electrically erasable ROM (EEPROM), or flash memory. The volatile memory can include random access memory (RAM) or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), Rambus dynamic RAM (RDRAM) and the like.

Persons skilled in the art may clearly understand that, for the purpose of convenient and brief description, only the division of the foregoing functional units or modules is used as an example for description, and in an actual application, the foregoing functions may be accomplished by different functional units or modules as required, that is, the internal structure of the apparatus is divided into different functional units or modules, so as to accomplish all or a part of the functions in the foregoing description Finally, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to parts of the technical features thereof, and these modifications and replacements do not make the essence of the corresponding technical solution depart from the spirit and scope of the technical solutions of the embodiments of the present invention and should be contained in the protection scope of the present invention.

What is claimed is:

1. A box cover device, comprising a gearbox, a transmission motor, a roller shutter cover and a transmission controller, wherein the gearbox comprises a transmission gear, a roller shutter shaft gear and a clutch gear; the transmission gear and the roller shutter shaft gear are arranged oppositely, and a clutching space is reserved between the transmission gear and the roller shutter shaft gear; a middle shaft is arranged at the center line of the clutching space vertical to the center connection line of the transmission gear and the roller shutter shaft gear; the clutch gear sleeves the middle shaft and is engaged with the transmission gear and the roller shutter shaft gear, a translation mechanism is arranged between the middle shaft and a gearbox case wall; the translation mechanism controls the middle shaft to drive the clutch gear to move close to or away from the transmission gear and the roller shutter shaft gear; the clutch gear, the transmission gear and the roller shutter shaft gear form a gear clutch;

the transmission gear is connected with an output shaft of the transmission motor, the output shaft drives the transmission gear to rotate in a forward or reverse manner or stop; the roller shutter shaft gear is connected with a roller shutter shaft and drives the roller shutter shaft to rotate in a forward or reverse manner or stop so as to drive a roller shutter cover connected with the roller shutter shaft to extend or retract or stop; the roller shutter cover is located at an opened top of a box; the roller shutter cover gradually covers the box during extension and uncovers the box during retraction; the clutch gear connects or disconnects engagement transmission with the transmission gear and the roller shutter shaft gear when moving close to or away from the transmission gear and the roller shutter shaft gear;

the transmission controller is connected with the transmission motor, the transmission controller receives forward or reverse rotation or stop control signals, then generates relative control commands to control the transmission motor to rotate in a forward or reverse manner or stop.

2. The box cover device according to claim 1, wherein the translation mechanism is a clutch thread which is arranged on the outer side of the middle shaft and mutually matches with the gearbox case wall; the clutch thread controls the middle shaft to move close to or away from the transmission gear and the roller shutter shaft gear.

3. The box cover device according to claim 2, wherein a translation push-pull rod or a knob is arranged at one end, extending from the gearbox case wall, of the middle shaft; the translation push-pull rod or the knob drives the translation mechanism to control the middle shaft to move close to or away from the transmission gear and the roller shutter shaft gear.

4. The box cover device manner according to claim 1, wherein a translation push-pull rod or a knob is arranged at one end, extending from the gearbox case wall, of the middle shaft; the translation push-pull rod or the knob drives the translation mechanism to control the middle shaft to move close to or away from the transmission gear and the roller shutter shaft gear.

5. The box cover device according to claim 1, further comprising a locating stop sheet, wherein the locating stop sheet sleeves the middle shaft and is located between the clutch gear and the gearbox case wall; the diameter of the locating stop sheet is larger than that of a through hole, through which the middle shaft penetrates the gearbox case wall.

6. The box cover device according to claim 1, further comprising a plane thrust bearing, wherein the plane thrust bearing sleeves the middle shaft and is located between the locating stop sheet and the clutch gear.

7. The box cover device according to claim 1, wherein the transmission controller is communicated with a control button through a wire communication module, or is communicated with a remote control in a frequency band through a wireless communication module; the transmission controller receives a control signal to decode; when the decoded signal data is consistent with the preset remote control information data, the transmission controller generates a relative forward or reverse rotation or stop control signal for the transmission motor according to the decoded signal data.

8. The box cover device according to claim 7, wherein the wireless communication module is a Bluetooth communication module or a mobile network communication module.

9. The box cover device according to claim 1, further comprising a light, wherein the light is connected with the transmission controller; the transmission controller compares the forward or reverse rotation or stop control signal with a preset light turn-on policy to generate a turn-on command for the light, so as to control the light to be turned on.

10. A control method of the box cover device, comprising:
oppositely arranging the transmission gear and the roller shutter shaft gear and reserving a clutching space between the transmission gear and the roller shutter shaft gear; arranging a middle shaft at the center line of the clutching space vertical to the center connection line of the transmission gear and the roller shutter shaft gear; using the clutch gear to sleeve the middle shaft such that the clutch gear is engaged with the transmission gear and the roller shutter shaft gear; arranging a translation mechanism between the middle shaft and the gearbox case wall;

connecting the transmission gear and the output shaft of the transmission motor; connecting the roller shutter shaft gear and the roller shutter shaft; connecting the roller shutter shaft and the roller shutter cover; placing the roller shutter cover at the opened top of the box; connecting the transmission controller and the transmission motor to form a box cover;

when the transmission controller receives the extension, retraction or stop control signal for the roller shutter cover, relatively generating the forward or reverse rotation or stop control signal to control the transmission motor to rotate in a forward or reverse manner or stop, driving the roller shutter shaft gear to rotate in a forward or reverse manner or stop through engagement transmission, so as to drive the roller shutter cover to extend, retract or stop;

using the translation mechanism to control the middle shaft to drive the clutch gear to move away from the transmission gear and the roller shutter shaft gear, so as to release engagement with the transmission gear and the roller shutter shaft gear, wherein the roller shutter shaft gear separates from the engagement transmission with the transmission gear;

using the translation mechanism to control the middle shaft to drive the clutch gear to move close to the transmission gear and the roller shutter shaft gear, so as to recover engagement with the transmission gear and the roller shutter shaft gear, wherein the roller shutter shaft gear recovers engagement transmission with the transmission gear.

11. The control method of the box cover device according to claim 10, wherein the translation mechanism is a clutch thread which is arranged on the outer side of the middle shaft and mutually matches with the gearbox case wall;

screwing a translation push-pull rod or a knob arranged at one end, extending from the gearbox case wall, of the middle shaft, the middle shaft is controlled to move close to or away from the transmission gear and the roller shutter shaft gear through the clutch thread.

* * * * *